United States Patent Office 2,899,626
Patented Aug. 11, 1959

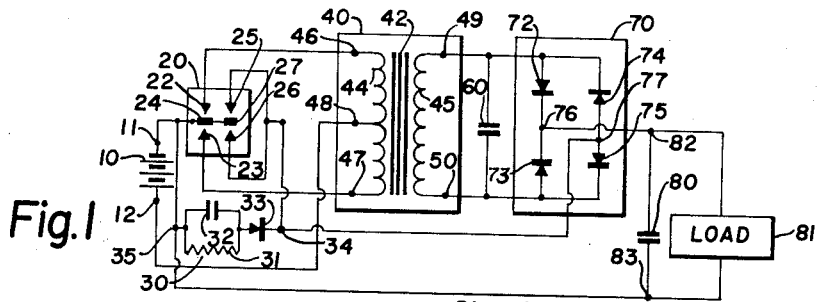
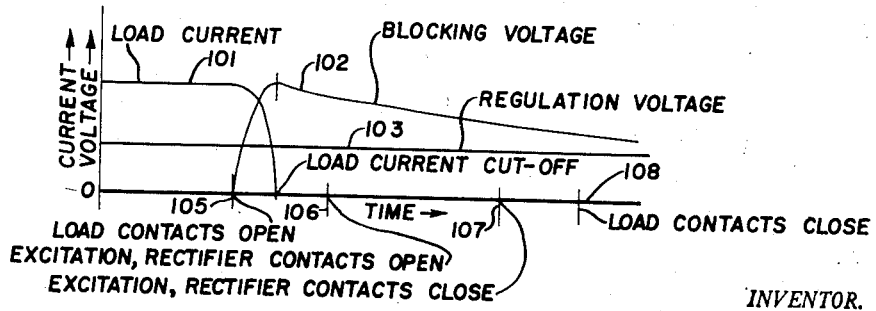

2,899,626

CONVERTER SYSTEM HAVING SEPARATION OF FUNCTION

Harold J. Brown, Indianapolis, Ind.

Application December 8, 1955, Serial No. 551,878

5 Claims. (Cl. 321—2)

My invention relates in general to vibrator power conversion systems, and in particular to circuit arrangements whereby the inherent functions are fully separated.

An object of my invention is to provide superior load energy absorption.

Another object is to provide increased power handling rating for any given vibrator.

Another object is to provide a superior consistency of life and performance.

Other objects and a fuller understanding of the invention may be had by referring to the following description and claims, taken in conjunction with the accompanying drawings, in which:

Figure 1 is a diagrammatic illustration of a converter circuit embodying the features of my invention in preferred form;

Figure 2 is a diagrammatic illustration of a converter circuit embodying the features of my invention in a modified form;

Figure 3 is a diagrammatic illustration of a converter circuit embodying the features of my invention in another modified form;

Figure 4 shows the load current, blocking voltage relationship during the vibrator switching interval.

With reference to Figures 1, 2 and 3, the converter system in which my separation of function may be employed comprises in general a power source 10, a vibrator 20 (Figs. 1 and 2) or 21 (Fig. 3), a load energy absorption circuit 30, a transformer 40 (Fig. 1) or 41 (Figs. 2 and 3), a buffer capacitor 60 (Fig. 1) or a suppression network 61 (Figs. 2 and 3), a rectifier 70 (Fig. 1) or 71 (Fig. 2), or rectifying contacts 85, 86, 87 (Fig. 3), and a load capacitor 80, adapted to supply power to load 81.

The vibrator 20 may be of any suitable design and comprises, generally, two opposed excitation contacts 22 and 23, and a vibrating contact 24, disposed therebetween, which is connected to a terminal 11 of the direct current source 10. The vibrator 20 has opposed load contacts 25 and 26 connected together and contact 27 disposed therebetween. The vibrator 21 has in addition rectifying contacts 85 and 86, in engagement with insulated contact 87. The load energy absorption circuit 30 comprises resistor 31 and capacitor 32 connected in parallel which are in turn connected in series with rectifier device means 33 with the combination having terminals 34 and 35. Terminals 34 and 35 are connected to load contacts 25, 26 and 27 in the vibrator 20 and 21. The transformer 40 has a magnetic core 42, a primary winding 44 and a secondary winding 45. The primary winding 44 has end terminals 46 and 47 and intermediate terminals 48. Secondary winding 45 has end terminals 49 and 50. Capacitor 60 is connected across end terminals 49 and 50. Transformer 41 has a magnetic core 43 and two primary windings 51 and 52 and secondary windings 53 and 54. The terminal 48 is connected to terminal 12 of the battery 10. Secondary winding 53 has end terminals 55 and 56 and secondary winding 54 has end terminals 57 and 58.

Suppression circuit 61 comprises capacitor 62 and 63 connected in series and having midpoint 64 and terminals 67 and 68 and rectifier 65 and resistor 66 connected in parallel. Rectifier 65 and resistor 66 are connected between midpoint 64 of capacitors 62 and 63 and vibrating contact 24. End terminals 67 and 68 are connected to excitation contacts 22 and 23 of interrupters 20 or 21.

Rectifier 70 of Figure 1 consisting of rectifying elements 72, 73, 74 and 75, connected as a bridge, is connected in parallel across secondary winding 45 of transformer 40. Opposed rectifiers 72 and 73 have midterminal 76 which is connected to the output terminal 82. Opposed rectifiers 74 and 75 of opposite polarity have midterminal 77. Terminal 77 is connected to load suppression network terminal 34.

Rectifier 71 of Figure 2 consists of opposed rectifying elements 72 and 73 with midterminal 76 and end terminals 78 and 79. End terminals 78 and 79 of rectifier 71 are connected to end terminals 56 and 58 of windings 53 and 54 of transformer 41. The rectifier of Figure 3 comprises rectifier contacts 85, 86 and 87 of vibrator 21.

Output terminal 82 in Figures 1, 2 and 3 is connected to load capacitor 80 and load 81. The other side of the load 83 is connected to contact 24 of vibrator.

With reference to Figure 1, opening of contact 25 or 26 and 27 will cause a diversion of the load current flowing through the secondary winding 45 and through rectifier 70 into load 81 into the load energy absorption circuit 30. Rectifier 33 of the load energy absorption circuit 30 is polarized so as to accept this current. In the absence of inductance in the circuits of battery 10 or leakage inductance in transformer 40, capacitor 32 will charge up to the regulation voltage, 103 of Figure 4. However, in actuality, the inductance inevitably existing in the system will cause voltage 102 to rise in excess of the regulation voltage 103, thereby cutting off the load current 101. Capacitor 32 will then commence to discharge through resistor 31 but will by virtue of the long time constant of elements 31 and 32 in relation to the vibrator off-time continue to block the load circuit. However, capacitor 32 will discharge during the comparatively long vibrator on-interval.

Thus at time 106 and 107 of the operation of the excitation contacts of the vibrator 20 or 21, the load circuit will be effectively opened and no currents will be flowing at make or break due to the load. The load contacts open at 105 and close at 108. The excitation rectifier contacts open at 106 and close at 107.

Figure 2 substitutes a decoupled transformer 41 and suppression circuit 61 for the conventional transformer 40 and buffer 60 of Figure 1. The decoupled transformer may be of the type shown in my Patent No. 2,710,374, dated June 7, 1955. By virtue of the interaction of the suppression circuit and the decoupled transformer the charging of the buffer capacitors is rendered harmless to the excitation contacts 22 and 23 and 24 of the vibrator interrupter 20 or 21.

Figure 3 incorporates a three section vibrator with rectifier contacts 85, 86 and 87 and load suppression sections with the consequent elimination of the static rectifier 70 or 71. The rectifier contacts should operate approximately in synchronism with the excitation contacts and for all practical purposes are operating at zero voltage and current. In the claims the word "rectifier" or equivalent terms includes the rectifiers 70, 71 or rectifying contacts 85, 86 and 87.

Improvement effected by my invention over the prior art may be understood by a comparison between the performance possible with previous classes of multi-function vibrator systems.

In a commonly used multi-function vibrator with a set of contacts acting to excite the transformer and interrupt the load current, it is difficult to arrange a load energy suppression circuit on the primary contacts so consequently existing interrupter systems invariably require the contacts to accept the load energy damage.

With my invention the primary contacts will be subject only to the damage due to the excitation circuit. Therefore the power handling capacity and life expectancy of the contacts would be the same as that which would occur in the existing systems at no load.

Another type of multi-function vibrator commonly used in the self-rectifying type with the primary contacts handling the excitation and the secondary contacts interruping the load and providing rectification. Application of load suppression techniques to the rectifying contacts of the vibrator increased the power handling capacity of these contacts four or five times, based upon the threshold of visible sparking. However, here again it is difficult to provide an effective load suppression network to the rectifying contacts of the vibrator since the rectifying element of the load suppression nework must sustain the high inverse voltage of the alternating current transformer or a portion thereof.

In my invention the rectifying element of the load suppression network need but sustain the comparatively small surge voltage in the direct current system.

Rectifiers with a low order of inverse voltage rating generally have a low voltage level of conduction. Effectiveness of contact suppression circuits is related to the conduction level of the rectifier in relation to the critical contact voltage levels, associataed with melting, boiling and arcing. Thus, the power handling capacity and life of the load interruption contacts will be greater than when these contacts are combined with the rectifying function.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vibrator system for energizing a load from a direct current source, said system having a vibrator with excitation and load interruption contacts, said excitation and load interrupting contacts both being open in an intermediate position of said vibrator, a transformer having primary and secondary winding means, excitation circuit means including said excitation interruption contacts for connecting the primary winding means of the transformer in circuit relation with said direct current source, load circuit means including said load interruption contacts for connecting the secondary winding means of said transformer in circuit relation with said load, and load energy absorption circuit means connected in shunt relation to the load interruption contacts of the vibrator, said excitation contacts opening subsequent to the opening of the load contacts and closing prior to the closing of the load contacts, said load current being cut off to substantially zero current and the voltage being substantially at a peak value at a time subsequent to the opening of the load contacts and prior to the opening of the excitation contacts.

2. In a vibrator system for energizing a load from a direct current source, said system having a vibrator with excitation and load interruption contacts, said excitation and load interrrupting contacts both being open in an intermediate position of said vibrator, a transformer having primary and secondary winding means, excitation circuit means including said excitation interruption contacts for connecting the primary winding means of the transformer in circuit relation with said direct current source, rectifier means, load circuit means including said load interruption contacts for connecting the secondary winding means of said transformer in circuit relation with said rectifier means and said load, and load energy absorption circuit means connected in shunt relation to the load interruption contacts of the vibrator, said excitation contacts opening subsequent to the opening of the load contacts and closing prior to the closing of the load contacts, said load current being cut off to substantially zero current and the voltage being substantially at a peak value at a time subsequent to the opening of the load contacts and prior to the opening of the excitation contacts.

3. In a vibrator system for energizing a load from a direct current source, said system having a vibrator with excitation and load interruption contacts, said excitation and load interrupting contacts both being open in an intermediate position of said vibrator, a transformer having primary and secondary winding means, excitation circuit means including said excitation interruption contacts for connecting the primary winding means of the transformer in circuit relation with said direct current source, rectifier means, load current means including said load interruption contacts for connecting the secondary winding means of said transformer in circuit relation with said rectifier means and said load, and load energy absorption circuit means connected in shunt relation to the load interruption contacts of the vibrator, said rectifier means comprising rectifier interruption contacts on said vibrator, said excitation contacts opening subsequent to the opening of the load contacts and closing prior to the closing of the load contacts, said load current being cut off to substantially zero current and the voltage being substantially at a peak value at a time subsequent to the opening of the load contacts and prior to the opening of the excitation contacts.

4. In a vibraor system for energizing a load from a direct current source, said system having a vibrator with excitation and load interruption contacts, said excitation and load interrupting contacts both being open in an intermediate position of said vibrator, a transformer having primary and secondary winding means, excitation circuit means including said excitation interruption contacts for connecting the primary winding means of the transformer in circuit relation with said direct current source, rectifier means, load circuit means including said load interruption contacts for connecting the secondary winding means of said transformer in circuit relation with said rectifier means and said load, and load energy absorption circuit means connected in shunt relation to the load interruption contacts of the vibrator, said load energy absorption circuit means including rectifier device means, and capacitor means and a resistance means connected in parallel with each other with both said capacitor and resistance means connected in series with said rectifier device means, said excitation contacts opening subsequent to the opening of the load contacts and closing prior to the closing of the load contacts, said load current being cut off to substantially zero current and the voltage being substantially at a peak value at a time subsequent to the opening of the load contacts and prior to the opening of the excitation contacts.

5. In a vibrator system for energizing a load from a direct current source, said system having a vibrator with excitation and load interruption contacts, said excitation and load interrupting contacts both being open in an intermediate position of said vibrator, a decoupled transformer having primary and secondary winding means, excitation circuit means including said excitation interruption contacts for connecting the primary winding means of the transformer in circuit relation with said direct current source, load circuit means including said load interruption contacts for connecting the secondary winding means of said transformer in circuit relation with said load, and load energy absorption circuit means connected in shunt relation to the load interruption contacts of the vibrator, said excitation contacts opening subsequent to the opening of the load contacts and closing prior to the closing of the load contacts, said load current being cut off to substantially zero current and the voltage being substantially at a peak value at a time subsequent to the opening of the load contacts and prior o theh opening the excitation contacts.

References Cited in the file of this patent

UNITED STATES PATENTS

| 2,306,003 | Sullivan et al. | Dec. 22, 1942 |
| 2,440,145 | Huetten | Apr. 20, 1948 |
| 2,445,398 | Huetten | July 20, 1948 |
| 2,564,279 | Reynolds | Aug. 14, 1951 |
| 2,710,374 | Brown | June 7, 1955 |

FOREIGN PATENTS

| 543,032 | Great Britain | Feb. 6, 1942 |